Dec. 6, 1927.  
W. H. WINSLOW  
1,651,937  
METHOD OF AND MEANS FOR MAINTAINING METALS IN A LIQUID CONDITION  
AND AT A PREDETERMINED TEMPERATURE  
Original Filed May 25, 1918  3 Sheets-Sheet 1

Fig. 1

Inventor  
William H. Winslow  
By Brown, Hanson & Batcheller  
Attys

Dec. 6, 1927.                                                              1,651,937
W. H. WINSLOW
METHOD OF AND MEANS FOR MAINTAINING METALS IN A LIQUID CONDITION
AND AT A PREDETERMINED TEMPERATURE
Original Filed May 25, 1918     3 Sheets-Sheet 2
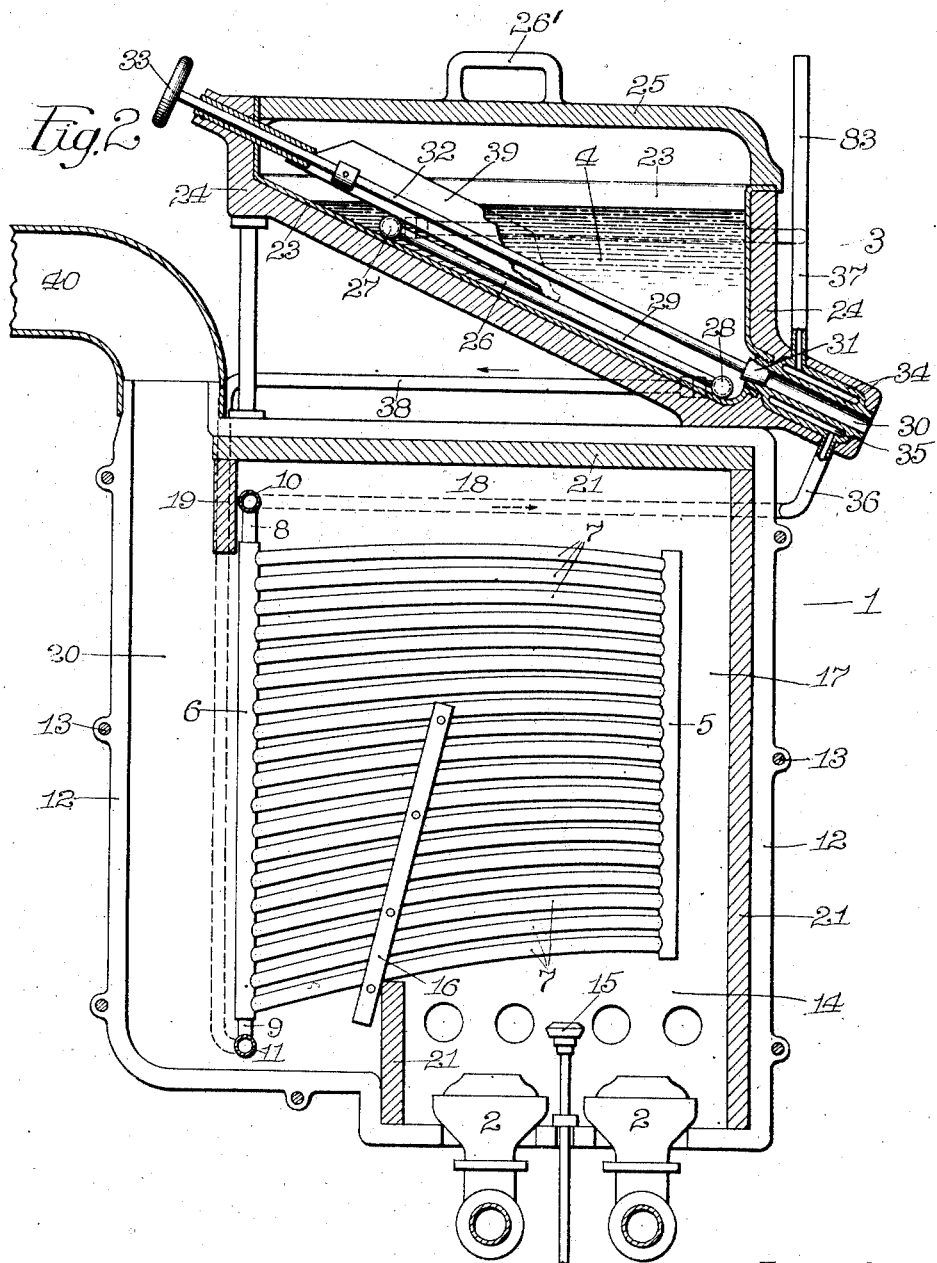

Dec. 6, 1927.  1,651,937
W. H. WINSLOW
METHOD OF AND MEANS FOR MAINTAINING METALS IN A LIQUID CONDITION
AND AT A PREDETERMINED TEMPERATURE
Original Filed May 25, 1918  3 Sheets-Sheet 3
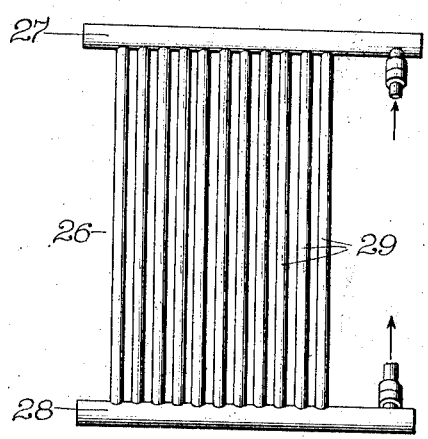
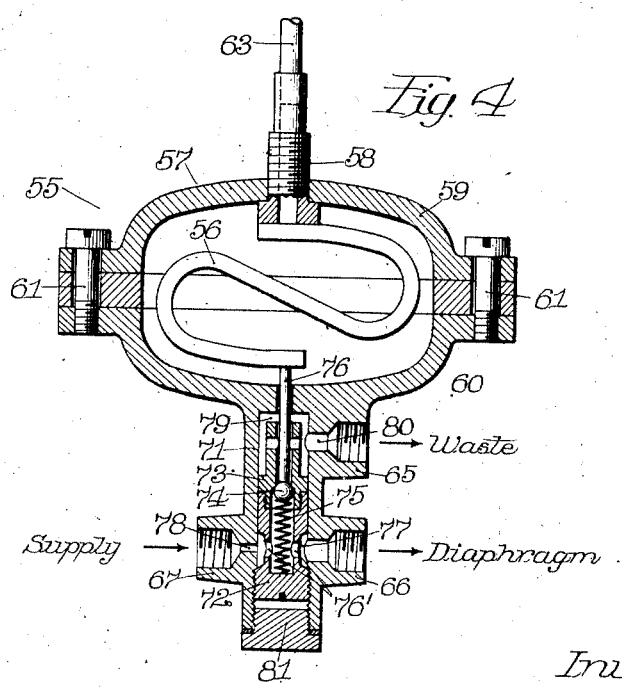
Inventor
William H. Winslow Patented Dec. 6, 1927.

1,651,937

UNITED STATES PATENT OFFICE.

WILLIAM H. WINSLOW, OF SOUTH HAVEN, MICHIGAN, ASSIGNOR TO WINSLOW SAFETY HIGH PRESSURE BOILER COMPANY, OF CHICAGO, ILLINOIS, A CORPORATION OF ILLINOIS.

METHOD OF AND MEANS FOR MAINTAINING METALS IN A LIQUID CONDITION AND AT A PREDETERMINED TEMPERATURE.

Application filed May 25, 1918, Serial No. 236,483. Renewed April 28, 1927.

My invention relates to a method of and means for maintaining metals in a liquid condition and at a predetermined temperature.

In industrial operations where it is desired to transfer heat from a given source to an object or body to be heated, I have observed that the direct transfer of heat from the source to the object or body to be heated is difficult to accomplish because of the wide variation between the desired degree of heat in the object and the temperature of the source. That is to say it is difficult to maintain at a constant temperature of say 500 degrees an object which is heated directly from a source of heat the temperature of which is in the neighborhood of 3000 degrees.

I have found that a suitable transferring medium between the source of heat and the object is desirable.

Consider the fire as a mass $m_1$ of gases having a specific heat $s_1$ and being at a temperature $T_1$. The quantity of heat contained may be represented in general as $Q_1$ and $Q_1 = s_1 m_1 T_1$.

The object to which this heat is to be transferred may be considered as comprising a mass $m_2$ of metal or the like having a specific heat of $s_2$ and a temperature $T_2$.

Assume that all the heat $Q_1$ from the fire is transferred to the metal, then $Q_1 = Q_2$ and since in general $Q_2 = s_2 m_2 T_2$ the two bodies namely the fire and the object to be heated may be compared on the basis of containing equal amounts of heat by the general equation—$s_1 m_1 T_1 = s_2 m_2 T_2$ and in order to change the quantity of heat either the mass or temperature may be varied.

In most cases the object to be heated is not of such character that the heat input to it from the fire may be readily controlled. I employ a transferring medium between the source of heat and the object to be heated which is capable of exerting a suitable control over the fire or is itself susceptible of proper control.

The above mentioned quantity of heat in passing from the source to the body to be heated will have an effect upon the transferring medium represented in general by the following: $Q = smT$ and when each of the three bodies contains equal amounts of heat the following equation is true in general:

$$s_1 m_1 T_1 = smT = s_2 m_2 T_2$$

so that if the temperature of any one of the three bodies is to be varied the mass or the quantity of heat may be varied and if the quantity of heat is to be varied the temperature or the mass may be varied.

I have found that a saturated vapor at the proper temperature is a very good transferring medium. Steam is entirely suitable for most purposes, although it will be apparent to those skilled in the art from the description of my invention that other vapors may be employed.

A saturated vapor, such as steam, contains a large amount of latent heat which is given up in condensation and makes possible the transfer of heat with a relatively small quantity of the transferring medium, namely, steam, and makes possible the transfer of heat in considerable quantity without change of temperature.

A further advantage of a saturated or condensing vapor is the possibility of maintaining the transferring medium at a constant temperature by maintaining a uniform pressure.

The laws of Boyle and of Gay-Lussac hold true within limits for steam so that we may apply the general equation of a gas—

$$pv = RT$$

wherein $p$ is the pressure, $v$ is the volume, $T$ is the absolute temperature and $R$ is a constant.

It can now be seen that if the volume of the transferring medium be maintained at a constant the second equation above may be written as follows—

$$s_1 m_1 T_1 = smp = s_2 m_2 T_2$$

and from the above equation it is apparent that so long as the pressure in the transferring medium, namely, steam, is maintained constant, the amount of heat contained and the temperature will be constant.

As the mass of the heated body varies in practice and there are certain heat losses, it is necessary in order to preserve the relation to vary either the pressure or the mass of the transferring medium and either the temperature or the mass of the source of heat.

From a practical consideration it is not economical to vary the mass of the transferring medium and it is not practically possible to vary the temperature of the source. I have therefore conceived the idea of allowing the pressure to vary and causing it thru an external connection to vary the mass of the source as by a suitable mechanical control, which in the apparatus I am about to describe, decreases the amount of fuel gas thereby cutting down the mass or quantity of the source of heat.

I shall now describe a particular embodiment of my invention in order to teach those skilled in the art how to practice the same.

Figure 1 is a diagrammatic side elevation of an embodiment of my invention;

Figure 2 is a vertical cross-section through the melting chamber and boiler;

Figure 3 is an elevation of the heat-transferring grid or coil within the melting chamber; and Figure 4 is a cross-section of the pilot valve which is shown in elevation in Figure 1.

The apparatus illustrated in the above drawings is suitable for melting type-metal which is an alloy of lead and antimony. The particular problem that this embodiment was designed to meet is to provide the type-metal at a suitable temperature for setting bearings and the like in cored castings in connection with the manufacture of machinery. For this purpose it is necessary to maintain the alloy at a temperature ranging within very narrow limits. The alloy has a melting point of 475° F. and it is essential that it be poured at a temperature not over 550° F. and be always available. It may obviously be employed for other purposes.

The means for performing this service comprises a boiler 1 which is provided with a number of gas burners 2 or the like, suitable control apparatus, to be described later, and a melting chamber 3, in which the type-metal 4 is maintained in a liquid condition at the proper temperature.

The boiler 1 is constructed in accordance with the teachings of my prior Patents 1,237,233 and 1,236,641, both issued August 14, 1917.

This boiler is built up of a number of individual sections, one of which is shown in elevation in Figure 2. Each section comprises a pair of vertical risers 5 and 6 which are connected by transverse tubes 7 that have their ends welded by autogenous welding to the risers 5 and 6. The transverse tubes 7 have a greater inclination at the lower end of the risers 5 and 6 than they have at the upper end of said risers and to this end the front riser 5 is made of less length than the rear riser 6. The transverse tubes are preferably slightly bowed in the plane of the section to relieve stresses which might be induced by unequal expansion.

The boiler is built up of a number of similar sections and these sections are connected by short tubes 8 and 9 to the upper and lower transverse headers 10 and 11 respectively. These short tubes 8 and 9 are welded to the sections and to the respective headers in order to secure an absolutely tight joint.

The boiler is enclosed by a cast-iron casing or housing 12 which is composed of halves fastened together by suitable flanges and bolts 13. The lower end of the casing 12 forms a suitable fire box 14 into which project the gas burners 2 and a small pilot burner 15. Each section of the boiler is provided with a suitable baffle member 16 secured to the transverse tubes in order to define a passage for the fire gases from the fire-box 14 upward to heat intensely the lower right-hand corner of the boiler, as viewed in Figure 2. The casing 12 is spaced away from the front headers 5 of the boiler to define a flue passage 17 communicating at its lower end with the fire box 14 and at its upper end with the space 18 which is provided between the top of the casing 12 and the top of the boiler. It is to be noted that the risers 5 and 6 are in contact with the side walls and are of a greater diameter than the transverse tubes 7 so that they define walls substantially impervious to the passage of gases. The space 18 is closed off at the rear of the boiler by means of the wall 19 which compels all of the gases to pass downward between the baffle wall 16 and the wall formed by the rear risers 6 and below the lower left hand corner of the boiler, as viewed in Figure 2, thru the smoke flue 20 formed in the rear of the casing 12. The inner walls of the casing 12 adjacent the fire-box 14, the flue 17 and the upper space 18 are lined with a suitable refractory material 21 to protect the casing from the action of the heated gases. The casing 12 with the boiler elements supported therein rests upon a suitable pedestal or base 22 as shown in Figure 1. The melting chamber 3 is mounted on top of the casing 12 and comprises a melting pot lining 23 which is preferably made of sheet iron and an outer enclosing body of heat insulating material or lagging 24. A suitable cover 25 is provided for closing off the melting chamber while the same may be readily removed as by means of the handle 26' for the purpose of charging fresh metal into the pot.

The bottom of the melting pot slopes gently upward and a suitable heating grid 26 is disposed adjacent the bottom, as is shown in Figure 2. This grid comprises a pair of headers 27 and 28 connected by a relatively large number of transverse tubes 29 which are welded to the headers 27 and 28. The melting chamber has at practically its lowest point a suitable discharge nozzle 30 which is controlled by a conical plug valve 31 having an operating rod 32 and a handle 33 for permitting the discharge of the liquid metal thru the nozzle 30.

The nozzle 30 is provided with a suitable double wall 34 which is formed of a tube of larger size welded at its end to the tube forming the nozzle 30 so as to form a steam jacketing space between the double walls. This steam jacketing space 35 communicates with the steam delivery pipe 36 which is connected to the steam header 10 of the boiler and also communicates by means of a pipe 37 with the upper header 27 of the heating grid 26. The lower header 28 of the heating grid is connected by a pipe 38 to the water header 11 at the bottom of the boiler. Steam passes from the boiler thru the pipe 36 to the steam jacket 35 about the nozzle 30 and then passes thru the pipe 37 to the heating grid 26 which transfers the heat of the steam to the metal in the melting pot. The grid 26 provides a number of passages for the steam in the transverse tubes 29 so that the movement of the steam therethru will be relatively slow and ample opportunity will be given the same for giving up its latent heat and condensing into water which runs back into the boiler thru the return tube 38.

The sloping bottom of the melting chamber is designed to meet the condition of charging cold metal into the pot. If the cold metal be dropped into a pot of hot metal it will tend to sink to the bottom and thus the colder metal would always be in the bottom of the pot and would be drawn out at once, if metal were required. In order to prevent this, I form a sloping bottom on such an angle that when a pig of metal, such as is shown at 39 in Figure 2, is introduced into the melting pot, it will not slide down to the bottom but will rest upon the heating grid 26 and be suspended at the top of the vessel in contact with the melted metal so that as the pig melts and the relatively cold metal proceeding therefrom begins to move downward towards the opening, it will be in direct contact with the heating grid 26 and will thus be heated to the proper degree before reaching the discharge nozzle 30.

All of the steam containing parts are sealed off hermetically so that the steam follows a closed path of circulation, no feed pump being necessary. The various pipes and other parts are welded together to withstand the pressure and to prevent leakage. The level of the water in the boiler stands normally less than half-way up the risers 5 and 6 whereby a fairly large space is provided in the upper parts of the risers and the upper transverse tubes 7 for heating and drying the steam as it is evolved. Inasmuch as this system comprises a closed circuit the level of the water in the boiler need not be particularly determined and it is immaterial whether the same be slightly higher or lower than indicated. The gases from the burners 2 have two paths of escapement from the firebox 14, namely, thru the flue 17 and down thru the transverse tubes 7 while some of the gases pass up thru the transverse tubes 7 between the baffle 16 and the front risers 5 and then down thru the tubes 7 between the baffle 16 and the rear riser 6. The hot gases passing up thru the flue 17 over the top of the boiler and down thru the tubes serve to dry the steam and aid in the separation of the water particles from the steam.

The gases are discharged into the smoke flue 20 and from there pass into the stack 40.

As pointed out above in order to maintain the temperature of the metal which is maintained at substantially 550° F. the pressure in the boiler and in the heating grid must be kept at substantially 1050 lbs. per square inch.

As the amount of heat to be supplied to the melting chamber varies considerably depending upon the quantity of metal passed thru this chamber, the amount of radiation and the like, it is essential that means be provided for keeping the pressure of the steam at the proper value to supply this heat. I therefore provide means controlled by the pressure of the boiler for varying the amount of heat in-put, in other words, the size of the fire, under the boiler.

The burners 2 are provided with a suitable fuel gas from the main 41 by means of a pipe 42 which is controlled by a diaphragm operated valve 43 for graduating the amount of fuel gas supplied to the burner. The pilot burner 15 is connected by a separate pipe 44 to the main 41 and is constantly burning while the device is in operation. The pipes 42 and 44 are controlled by suitable cocks 45 and 46 respectively. The diaphragm controlled valve 43 comprises a valve seat or port 47 controlled by a movable valve member 48 which is connected to a stem 49, this stem being connected to a suitable diaphragm contained in the casing 50, said casing containing a chamber upon the underside of the diaphragm and supplied with fluid under pressure from the pipe 51, the pressure of the fluid upon said diaphragm tending to open the valve. Upon the opposite side of the diaphragm is provided a compression spring 52 contained within the casing 53 and regulable by means of the adjusting screw 54.

It can be seen from the above construction that the valve 43 tends to close upon failure of fluid pressure from the pipe 51. In other words, this valve is spring closed and pressure opened.

The operating diaphragm for the controlling valve 43 is not subject directly to the pressure which is maintained in the boiler as this pressure is extremely high and there would be danger of rupture or leakage in addition to the large temperature range to which the parts would be subjected. I have therefore interposed a pilot valve 55 which is controlled by the pressure in the boiler to govern the operation of the diaphragm valve 43. The pilot valve 55 comprises a Bourdon tube of steel 56 bent into an S-shape to increase the length thereof for the given space, this Bourdon tube 56 being enclosed within a cast iron or steel housing 57. The Bourdon tube 56 is preferably secured by welding to a plug 58 connected to the upper half 59 of the casing 57, and to the plug 58 there is connected as by welding a pipe 63 which is in communication with the interior of the boiler being connected to a vertical standpipe 64 which connects the upper and lower transverse headers 10 and 11 of the boiler. The casing 57 is divided into two parts 59 and 60 which are connected together by suitable bolts 61. The lower part of the casing 60 carries a valve with suitable ports and sockets 65, 66 and 67 which are connected to suitable pipes 68, 51 and 69, respectively. The pipe 69 is connected preferably to the city water main, or other suitable source of pressure. The pipe 69 is controlled by a valve 70 for shutting off the water when it is desired to stop the operation of the device. The pipe 68 is an overflow or waste pipe and the pipe 51 leads to the chamber below the diaphragm which operates the valve 43. The shell or housing 71 is hollowed out to receive a suitable hollow plug 72 which is threaded into the inside of the casing 71 and bears at its upper end a removable valve seat member 73 which is provided with a ball valve 74 normally held upon its seat by a small coiled spring 75. An operating pin or stem 76 for pushing the ball valve off of its seat rests at its outer end against the end of the Bourdon element.

The plug 72 has a transverse opening 76' therethrough to permit the passage of water from the circular passageway 77 which is formed at a reduced part of the plug to enter the axial chamber and to gain access to the ball valve 74. Water or other fluid under pressure is supplied thru the pipe 69 and enters the circular chamber 77 thru a small sized port 78. The plug 72 fits closely into the casing both above and below the circular chamber 77 to prevent the leakage of water. A chamber 79 is formed above the valve seat member 73 and this chamber communicates thru the port 80 with the waste pipe 68. The lower end of the shell or casing 71 is closed off by a suitable plug 81. It is to be noted that the plug member 72 can be adjusted in the casing 71 so as to vary the effective pressure in the boiler at which the ball valve will be raised from its seat. For this purpose the lower end of the plug 72 is slotted or otherwise adapted to be adjusted by means of a screw driver or other tool.

The ball valve 74 is normally on its seat and water or other fluid under pressure enters from the supply pipe 69 thru the small admission port 78 and passes on to the diaphragm chamber thru the pipe 51. This pressure operating upon the diaphragm raises the valve member 48 uncovering the valve port 47 and permitting the gas to pass thru the pipe 42 to the burners 2. If the pressure in the boiler rises above a predetermined amount the expansion of the Bourdon tube 56 which is caused thereby presses down upon the valve stem 76 unseating the ball valve 74 thereby bleeding the diaphragm chamber 50 and permitting the spring 52 to close or partially close the valve 43 so as to reduce the amount of fuel gas supplied to the burners 2. When the pressure in the boiler drops the Bourdon tube 56 contracts permitting the ball valve 74 to seat so that the water which is supplied thru the small passage 78 again exerts its full pressure against the diaphragm opening the valve 43. It is apparent therefore that any accident to the apparatus will result in the valve 43 being closed off to render the apparatus safe. That is to say, if the city water pressure fail, or a leak in the water pipe be caused, the spring 52 will automatically close off the valve 43 to render the apparatus inactive.

The safety of the boiler is noteworthy. The boiler and all parts under pressure are constructed of tubes of a relatively small size capable of withstanding great pressures and in practice I have subjected the boiler to a pressure of 3000 lbs. per square inch without rupture. The particular boiler which I have illustrated comprises six sections, all welded to the upper and lower transverse headers. These sections are supported from the headers 10 and 11, which headers project outward thru the casing 12 thereby supporting the boiler. Even if a rupture should occur in any of the tubes of the boiler, the heavy cast iron casing 12 would tend to prevent any damage therefrom. Any desired temperature of the steam may be secured and regulated for by adjusting the pilot valve 55 to maintain the proper pressure as indicated upon the gauge 82.

I have connected a small pipe 83 which is closed at its upper end to the highest point in the system to serve as an air trap. As any air that might accidentally be contained in the system would under the very high pressure which maintains in the boiler, occupy a small space, it is apparent that very little room in the air trap 83 is necessary to contain such entrained air.

While I have described one particular embodiment of my invention it is to be understood that the invention is not limited to the precise details of construction which I have illustrated and described. It is apparent that the method of operation which I have devised may be practiced in a great variety of apparatus. It is also apparent that metals of different melting points may be introduced into the chamber 3 and reduced to the liquid state or brought to the desired temperature.

I claim:

1. The method of melting type metal which consists in bringing the same thermally in contact with saturated steam and maintaining said saturated steam under a substantially constant temperature in a hermetically closed chamber.

2. The method of melting and maintaining type metal at a substantially constant temperature which consists in bringing the same in thermal contact with a body of saturated steam held at a constant volume in a hermetically sealed chamber and in supplying heat to said steam in quantity sufficient to maintain said constant body of steam at a predetermined pressure.

3. In combination a heating chamber, a vapor tube in said chamber, a boiler connected to said vapor tube, said boiler, tube and connection being hermetically sealed and means for maintaining a constant vapor pressure in said boiler and tube sufficient to maintain a temperature of the order required to melt type metal.

4. In combination, a heating chamber, a vapor conduit formed of small bore tubing in said chamber, a welded water-tube boiler connected to said vapor conduit by welding to form a hermetically closed circuit, said vapor conduit and said heating chamber being placed higher than said boiler in order that the condensing vapor in said vapor conduit may drain back to said boiler and means for maintaining a constant pressure in said boiler and conduit, of the order of one thousand pounds per square inch.

5. In combination a melting chamber adapted to melt type metal, a vapor conduit in said chamber, a boiler connected to said vapor conduit, said boiler comprising a plurality of relatively small bore tubes only, said vapor conduit comprising small bore tubes only, and small bore tubes connecting said conduit and said boiler and means for maintaining steam in said conduit at a temperature sufficient to melt said type metal.

6. In combination, means for supporting a mass of type metal to be heated, a furnace for supplying heat and a hermetically sealed vessel containing steam, said vessel forming a thermal conduit between said furnace and said mass of type metal and serving to transfer sufficient heat from said furnace to said mass of metal to maintain said metal at a predetermined temperature and in the melted condition.

7. In combination, a heating tube of small diameter, a boiler comprising tubes of small diameter only, the heating tube and the boiler being connected together by welding to form a closed thermal circuit, and means for maintaining the temperature of the fluid in the closed thermal circuit at a predetermined value corresponding to the temperature of melting type metal.

8. In combination, a heating tube of small diameter, a boiler comprising tubes of small diameter only, the heating tube and the boiler being connected together by welding to form a closed thermal circuit, means for maintaining the temperature of the fluid in the closed thermal circuit at a predetermined value corresponding to the temperature of melting type metal, said means comprising a burner, means for supplying fuel to the burner, and means governed by the pressure of the fluid for governing the supply of fuel to the burner.

9. As means for melting type metal the combination of a boiler and a melting pot having a radiator, said boiler being formed of wrought metal parts welded together, said radiator being formed of wrought metal parts welded together, and pipes connecting said parts, said pipes being welded to said radiator and to said boiler, said radiator being so placed as to receive steam from the boiler and return the water of condensation by gravity, said boiler, radiator and connecting pipes being sealed to withstand a pressure of the order of one thousand pounds per square inch.

10. In combination, a boiler having a fire box, a melting pot having a radiator and pipes connecting the radiator and boiler, said radiator being located above the boiler so that the water of condensation in the radiator returns by gravity to the boiler, said boiler, radiator and connections comprising tubes of relatively small diameter only all welded together, and means to heat the boiler to maintain a saturated vapor pressure in the radiator of the order corresponding to the temperature required to melt type metal.

11. In a melting pot suitable for melting type metal, a chamber having a sloping floor, a heating radiator on said floor, said radiator comprising a series of substantially parallel tubes of small bore connected at their ends, manifold tubes for making said connection, said manifold tubes being connected to said parallel tubes by welding, means for delivering steam to the upper manifold and means for draining water from the lower manifold.

12. In combination, a melting pot and a boiler, said melting pot having a shell for containing type metal, a radiator enclosed by said shell, said shell having a substantially flat sloping floor, a pouring nozzle forming an extension of said shell, said radiator comprising a substantially flat grid lying on the bottom of said shell and consisting of a group of parallel tubes and manifolds connecting the ends of said tubes in parallel, said boiler comprising a water-tube boiler constructed of a pair of headers with cross tubes welded to said headers and connecting said headers, the headers being generally vertical and the tubes being generally horizontal, an enclosing shell surrounding the pouring nozzle and welded thereto to form a steam jacket, a tube welded to said steam jacket and to the upper end of one of the headers of the boiler, a tube leading from said steam jacket to the upper one of said manifolds of the radiator and a tube leading from the lower one of the manifolds of said radiator to the lower end of the header of the boiler, said melting pot being placed above the boiler to permit the condensate to drain back into the boiler.

13. The method of melting and maintaining under constant temperature a body of type metal which comprises, confining a body of water in a closed vessel, the lower part of which is subject to heating and the upper part of which is in thermal contact with the type metal, heating the water in the lower part of the vessel to generate saturated steam, condensing the steam at the upper part of the vessel by thermal transfer of heat to the type metal, draining the condensate by gravity back to the lower part of the vessel, and regulating the heat input into the lower part of the vessel in accordance with the pressure of steam in the vessel.

14. As a means for melting type metal and holding it at an even and proper temperature, the combination of, a pot for the metal, a furnace for developing heat, and a completely sealed vessel containing a fixed charge of water, the lower end of said vessel being disposed in the furnace and the upper end being disposed in said pot, the water in said vessel being suitably heated by said furnace and partly evaporated to fill the vessel with saturated steam at a pressure corresponding to a temperature for melting type metal, said steam rising to the upper part of said vessel, giving off its heat, and draining back into the lower heated part of the vessel, whereby the type metal in said pot is supplied with heat by the condensing steam and is held at an even temperature in the melted condition.

In testimony whereof, I hereunto subscribe my name this 22nd day of May A. D. 1918.

WILLIAM H. WINSLOW.